July 13, 1943.     O. F. VAN HORN ET AL     2,324,125
FIREARM
Filed Feb. 21, 1941     8 Sheets-Sheet 2

INVENTORS
OERTEL F. VAN HORN
JOHN D. WHITTAKER
BY
Richards & Geier
ATTORNEYS July 13, 1943.  O. F. VAN HORN ET AL  2,324,125
FIREARM
Filed Feb. 21, 1941  8 Sheets-Sheet 6

INVENTORS
OERTEL F. VAN HORN
JOHN D. WHITTAKER
BY
Richards & Geier
ATTORNEYS

July 13, 1943.   O. F. VAN HORN ET AL   2,324,125
FIREARM
Filed Feb. 21, 1941    8 Sheets-Sheet 7

INVENTORS
OERTEL F. VAN HORN
JOHN D. WHITTAKER
BY
Richards & Geier
ATTORNEYS

July 13, 1943.   O. F. VAN HORN ET AL   2,324,125
FIREARM
Filed Feb. 21, 1941   8 Sheets-Sheet 8

INVENTORS
OERTEL F. VAN HORN
JOHN D. WHITTAKER
BY
Richards & Geier
ATTORNEYS

Patented July 13, 1943

2,324,125

UNITED STATES PATENT OFFICE 2,324,125

FIREARM

Oertel F. Van Horn, New York, and John D. Whittaker, Babylon, N. Y., assignors to Automatic Appliance Corporation, New York, N. Y., a corporation of New Jersey Application February 21, 1941, Serial No. 379,916

10 Claims. (Cl. 42—3)

This invention relates to fire-arms and refers more particularly to convertible pistols and rifles.

So-called auto-loading pistols and rifles are so constructed that the trigger must be pulled and released each time a shot is fired. If continuous firing without a separate actuating of the trigger for each shot is desired, it is necessary to use specially constructed machine and sub-machine guns which are not adapted to the general uses of an ordinary pistol or rifle.

An object of the present invention is to eliminate this necessity of using different fire-arms for continuous and intermittent firing and to provide a fire-arm of light weight having simple and effectively operable means for converting it from an intermittently shooting fire-arm to a continuously shooting one, and vice-versa.

Another object is the provision of quickly and effectively operating means for converting self-loading pistols and rifles which shoot intermittently, into machine guns automatically discharging their bullets one after the other while the trigger is held in a depressed position.

A further object is the provision of means enabling the user to hold a pistol or a rifle firmly during continuous firing, thus enhancing the accuracy of the firing.

A still further object is the provision of simple and effectively operating means for automatically actuating the hammer of a pistol or rifle at predetermined intervals to enable it to strike the firing pin several times in succession and discharge a plurality of automatically supplied cartridges, while the trigger is depressed.

Yet another object is the provision of a convertible automatic pistol or rifle which is so constructed that it may shoot continuously while the trigger is held in a depressed position and that the firing is interrupted as soon as the trigger is released.

Another object is the provision of a convertible fire-arm having means regulating the speed of shooting during continuous firing.

Other objects of the present invention will become apparent in the course of the following specification.

In accomplishing the objects of the present invention, it was found advisable to provide a selector or converter which is installed on a pistol or rifle and which may be moved by hand from an inoperative position to an operative position, and vice-versa. In its inoperative position the converter or selector does not affect the movements of the sear or any other part, so that the fire-arm operates in the usual manner and the trigger must be pulled and released once for each shot. The selector or converter may be moved, however, to an operative position in which it will maintain the sear out of engagement with the hammer while the trigger is depressed. A locking element which is actuated automatically by the recoil movement of the slide or a part connected therewith, may be used to prevent the hammer from following the slide during its entire movement and to cause the hammer to swing at predetermined intervals relatively to the slide from the cocked position to the firing position, while the selector or converter is in the operative position.

The receiver of a pistol may be provided with a butt stock and/or a grip and the cartridge clip or magazine of the pistol may be so altered that it can serve as such grip for steadying the muzzle end of the gun.

The invention will appear more clearly from the following detailed description when taken in connection with the accompanying drawings showing, by way of example, preferred embodiments of the inventive idea.

Figure 3:
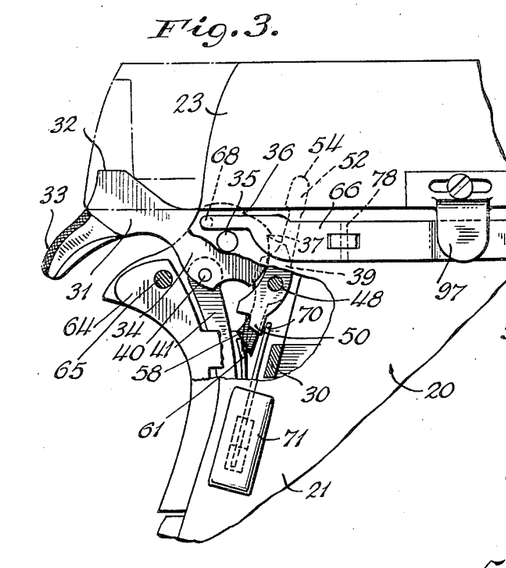
Figure 3 is similar to Figure 1 and shows the parts in the position in which the pistol is ready for continuous firing.
Figure 4:
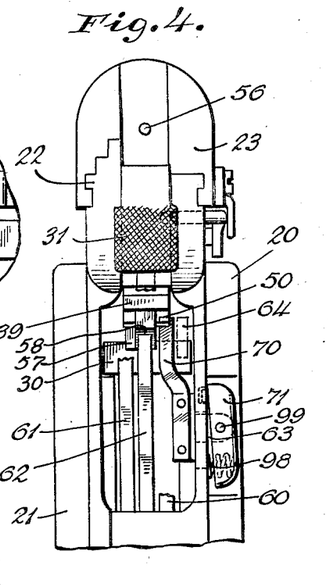
Figure 4 is a rear view of the pistol shown in Figure 3 with some parts removed.
Figure 6:
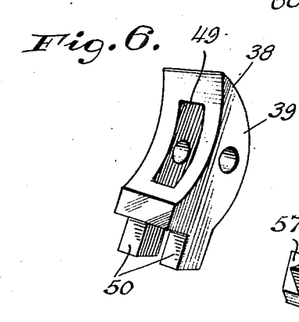
Figure 6 is a perspective view of the sear.
Figure 7:
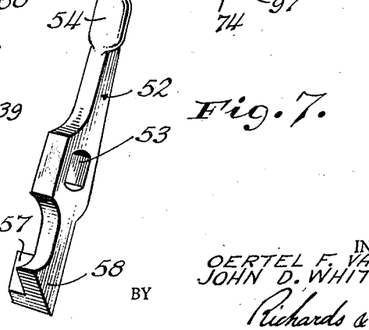
Figure 7 is a perspective view of the disconnector.
Figures 8, 9, 10, 11, 12, 13, 14:
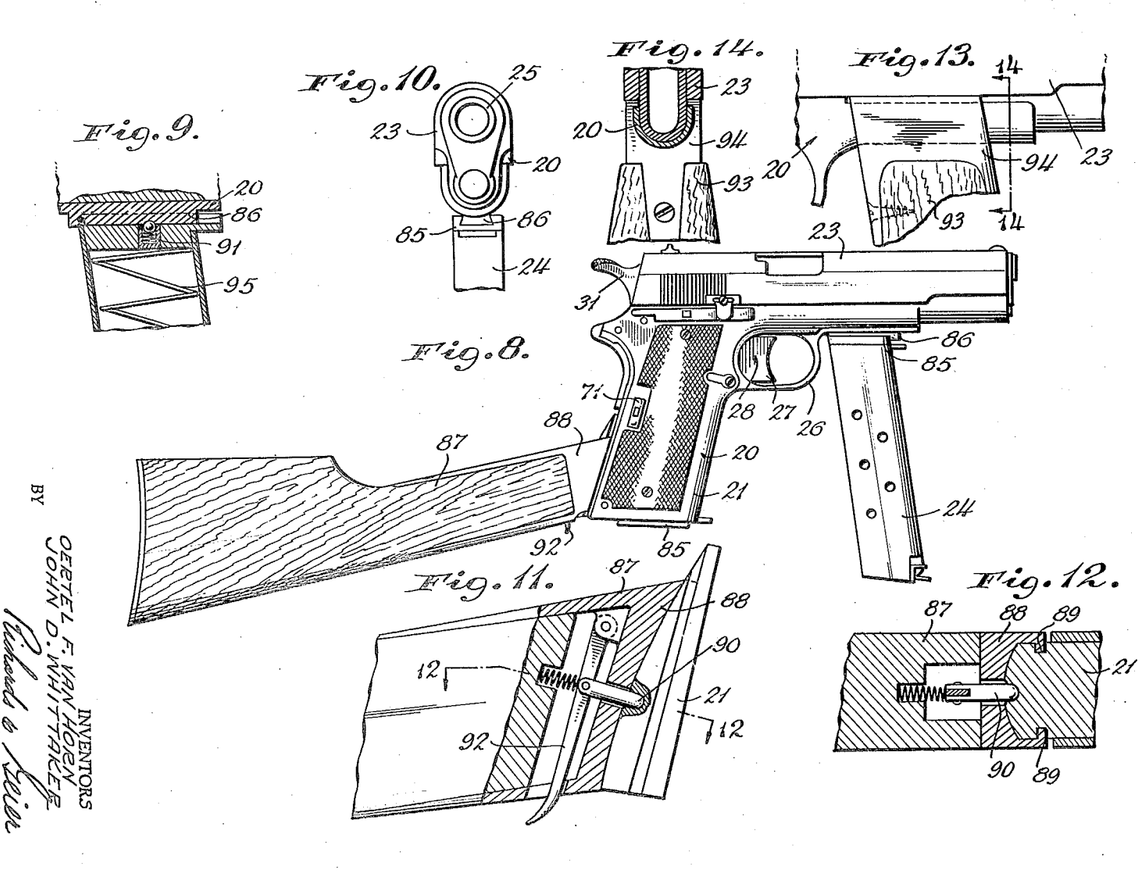
Figure 8 is a side view of the pistol with all the parts attached together.
Figure 9 is a fragmentary sectional view showing the cartridge clip or magazine as being attached to the lower forward portion of the pistol receiver.
Figure 10 is a front view of the pistol showing the cartridge clip or magazine serving as a handle.
Figure 11 is a fragmentary side view, partly in section, showing the connection of the butt stock with the pistol.
Figure 12 is a section along the line 12—12 of Figure 11.
Figure 13 is a fragmentary side elevation illustrating another method of attaching a handle to the receiver.
Figure 14 is a section along the line 14—14 of Figure 13.

The automatic pistol shown in Figures 1 to 12 of the drawings includes a receiver 20 (Fig. 8) having a hollow handle 21 and guides 22 (Fig. 4). A slide 23 (Fig. 8) is reciprocable upon the guides 22 and contains the usual barrel 25 (Fig. 10).

The hollow handle 21 may contain a magazine 24 which is inserted from below into the handle and which may be automatically locked therein by the usual magazine catch. The magazine is adapted to receive the usual number of cartridges and to supply them one by one into the chamber of the piston by means of the magazine spring 95 (Fig. 9).

Figures 1, 2:
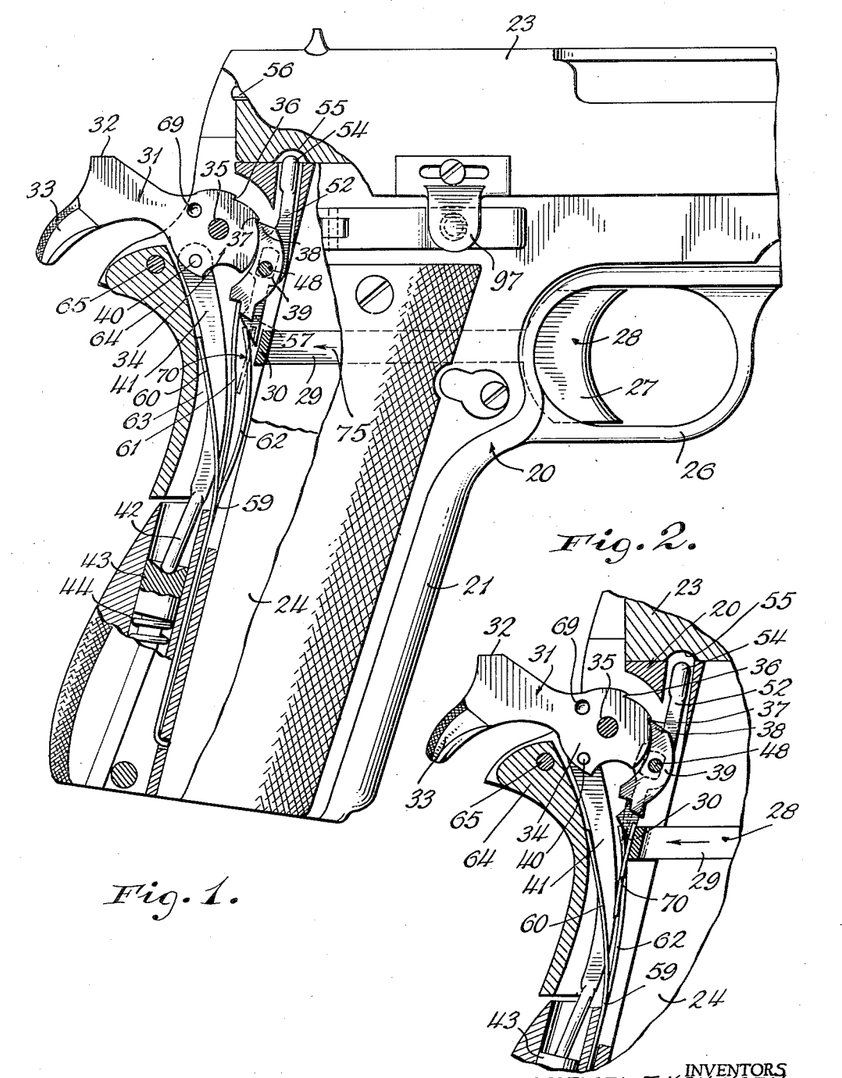
Figure 1 shows partly in side elevation and partly in section a portion of a converted auto-loading pistol constructed in accordance with the principles of the present invention, the pistol being shown when it is ready for the usual intermittent firing.
Figure 2 shows the position of some of the parts illustrated in Figure 1 while the trigger is being pulled after firing and the pistol is reloaded.

The receiver 20 is provided with a trigger guard 26 into which the front end 27 of the trigger 28 projects. The trigger 28 has the elongated rear portion 29 extending within the handle and ending in a transverse rear end 30 which is arranged close to the firing mechanism (Fig. 1).

The firing mechanism includes a hammer 31 having a striking surface 32, a projecting portion 33 used for manually cocking the hammer and a roundish supporting portion 34 which is mounted upon a pin 35 carried by the receiver. The portion 34 is provided with notches 36 and 37 adapted to engage an end 38 of a sear 39.

The supporting portion 34 of the hammer carries a pin 40 and is provided with an inner slot containing the end of the hammer strut 41 which is mounted upon the pin 40. The hammer strut 41 is attached by the pin 40 to the hammer 31 in rear of the hammer pin 35 and the lower end 42 of the strut 41 rests upon the cap 43 of the main spring 44.

The sear 39 carried by a pin 48, is of the usual form and is shown in greater detail in Figure 6 of the drawings. The sear is provided with an inner longitudinal slot 49 and has two downwardly depending projections 50 separated by the slot 49.

A disconnector 52 is held in its several positions by the pin 48 within the slot 49 of the sear and is shown in greater detail in Figure 7. The pin 48 extends through an elongated opening 53 formed in the disconnector, so that the latter can move up and down relatively to the pin. An end 54 of the disconnector fits into a groove 55 provided in the under-side of the slide 23 which carries the firing pin 56 (Figure 1).

The disconnector includes a projection 57 (Fig. 7) extending to one side of a triangular end portion 58.

A sear spring 59 of the usual type is provided with three fingers or ribs 60, 61 and 62. The rib 60 engages the usual grip safety 64 which is situated to the rear of the pistol and is carried by the pin 65 mounted in the receiver 20.

The rib 61 of the spring 59 engages the sear 39, while the rib 62 engages the end portion 58 of the disconnector 52.

The converter or selector constructed in accordance with the present invention is mounted upon the handle 21 of the pistol and includes a resilient converter finger 70 (Fig. 4) which is carried by a block 63 carrying a pivot 99 upon which a knob or button 71 is mounted. A spring 98 pressing against the button 71 is used to maintain the block 63 in the desired position. The block 63 which is movable along with the resilient finger 70, may be shifted manually through a slot provided in the handle 21 from an upper "on" position, or operative position, shown in Figure 4, to an inoperative lower "off" position, and vice versa.

Figure 5:
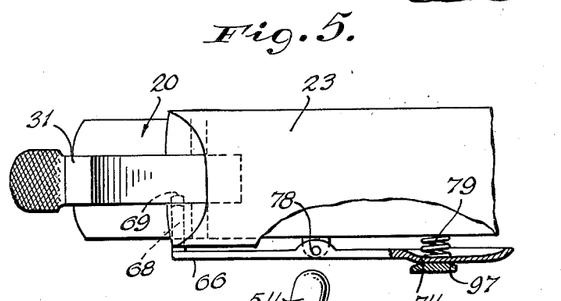
Figure 5 is a top view of the pistol shown in Figures 3 and 4 with some parts removed.

The mechanism used to prevent the hammer 31 from following the slide 23 during continuous firing, includes a plate 66 (Fig. 5) which is mounted upon a pivot 78 carried by the receiver 20. The plate 66 is located upon an outer surface of the receiver 20 below the slide 23 and close to the hammer 31, so that a pin 68 carried by the plate 66 may be inserted into a recess or bore 69 (Figures 1 and 2) provided in the hammer 31. A spring 79 presses against the bent end 74 of the plate 66 and tends to press the pin 68 against the hammer 31 (Figure 5).

The slide 23 carries a projection or cam 97 which is movable along with the slide and which may engage the bent end 74 of the plate 66 and, by swinging the plate 66 about its pivot 78, compresses the spring 79 and withdraws the pin 68 from the bore 69 of the hammer 31.

The cam 97 may be adjusted to a number of positions upon the slide 23, thereby varying the time at which the hammer strikes the firing pin. This varies the speed with which the bullets are discharged during continuous firing.

The pistol is operated as follows:

In the position shown in Figure 1, the resilient finger 70 is situated below the projections 50 of the sear 39. This is the inoperative "off" position of the finger 70 in which the block 63 and the button 71, shown in Figure 4, are situated in their lower position. Then the pistol operates in the usual intermittent manner, so that the trigger 28 must be depressed and released once for each shot. This usual operation is described briefly hereinbelow.

The hammer 31 is held in the cocked position by the engagement of the end 38 of the sear 39, with the notch 37 of the hammer. When the shooter pulls the trigger 28 while pressing against the conventional grip safety 64, the trigger will move in the direction of the arrow 75, and its end 30 will strike the end 58 of the disconnector 52.

In the position shown in Figure 1, the platform 57 of the disconnector 52 is situated next to one of the projections 50 of the sear 39, so that it will engage one of the projections 50. Therefore, the pulling of the trigger 28 will cause the sear 39 to swing jointly with the disconnector 52 about the pivot 48, against the action of the spring arms 61 and 62.

The end 38 of the sear 39 will be withdrawn from the notch 37, thereby freeing the hammer 31. The spring 44 acting upon the hammer strut 41, will swing the hammer 31 about the pin 35 causing the surface 32 of the hammer to strike the firing pin 56, thereby flaring the cartridge.

As soon as the cartridge (not shown) is fired, the pressure of the powder gases, while driving the bullet forward, forces the slide 23 and the barrel 25 together rearward. The barrel 25 is released from the slide 23 by the usual mechanism which is not illustrated.

The hammer 31 is swung rearwardly by the recoil of the slide 23 until its notch 37 is again engaged by the end 38 of the sear 39, which is pressed against the hammer by the spring arm 61.

The empty shell is extracted and a new cartridge loaded from the magazine 24 into the chamber by the usual mechanism, which is not shown in the drawings.

The slide 23 is returned to its forward position by the usual recoil spring (not shown). During this reciprocatory movement of the slide, the pin 68 is inserted into the hole 69 of the hammer 31 by the spring 79 and then withdrawn again by the cam 97 carried by the slide 23 before the latter reaches its forward position. Since the hammer 31 is held by the sear 39, the pin 68 performs no useful function in the inoperative position of the resilient finger 70.

In the beginning of the recoil movement, the walls of the groove 55 of the slide 23 will press downwardly and inwardly upon the end 54 of the disconnector 52, so that the disconnector will move downwardly in relation to its pin 48. This downward movement of the disconnector 52 is made possible by the elongated form of the opening 53 through which the pin 48 extends and by the fact that the spring arm 62 engages a slanting surface of the end 58 of the disconnector.

In the downward position, which is shown in Figure 2, the projection 57 of the disconnector 52 will be situated below the projections 50 of the sear 39. Therefore, if, as shown in Figure 2, the shooter continues to hold the trigger 28 in the depressed position after a shot has been fired, there will be no engagement between the sear 39 and the disconnector 52, so that continued pressure of the end 30 of the trigger 28 against the disconnector 52 will fail to withdraw the sear 39 from the notch 37 and to release the hammer 31.

Thus, if the resilient finger 70 is situated in its downward inoperative position, the firing mechanism of the pistol will operate in the usual manner and only one shot will be fired upon each pull of the trigger.

In order to fire a second shot, the user must release his pressure against the end 28 of the trigger 27 allowing the trigger 28 to return by spring action to its original position. At the same time, the pressure of the spring arm 62 against the inclined surface of the end 58 of the disconnector 52 will cause the disconnector to swing slightly about its pin 48 and to move upwardly from the position shown in Figure 2 to the position shown in Figure 1.

As a result of this upward movement, the end 54 of the disconnector 52 will be moved into the groove 55 of the slide 23 and the projection 57 of the disconnector will be in engagement with a projection 50 of the sear 39.

If the user now again pulls the trigger 28, so that the end 30 of the trigger will swing the disconnector 52, the movement of the latter will be transmitted now to the sear 39. The end 38 of the sear 39 will be withdrawn from the notch 37, so that the spring 44 and the hammer strut 41 will be free to actuate the hammer and to cause the firing of another shot.

It is thus apparent that, in the inoperative position of the finger 70, shown in Figures 1 and 2, the pistol operates in the same manner as the self-loading pistol of the usual type, so that the trigger 28 must be released and pulled again before the next shot can be fired.

Figures 3 and 4 show the positions of the firing mechanism whenever the pistol is to be used as a machine gun for the continuous firing of shots.

In order to provide for continuous firing and to convert the pistol into a machine gun, the knob 71 is actuated to move the block 63 and the resilient finger 70 carried thereby from the inoperative position shown in Figures 1 and 2 to the operative position shown in Figures 3 and 4, in which the upper end of the finger 70 is situated between a projection 50 of the sear 39 and the trigger end 30.

As soon as the trigger is pulled to fire the first shot, the trigger end 30 will cause the withdrawal of the sear 39 from the hammer 31, so that the hammer will strike the firing pin 56 and cause the firing of the first shot.

The slide 23 will carry out its recoil movement and will push downwardly the disconnector 52 in the described manner. However, if the user now continues to press upon the trigger 28, this pressure will be transmitted by the finger 70 to the sear 39, so that the sear will be maintained in its inoperative position and the spring arm 61 will not be allowed to bring the sear 39 into engagement with the hammer 31.

The recoil movement of the slide 23 will swing the hammer 31 back into its cocked position, but it will be held now temporarily in this position solely by the pin 68 situated in the hole 69 of the hammer. The cam 97 is so disposed upon the slide 23 that it will engage the portion 74 of the lever 66 shortly before the slide 23 is returned to its normal forward position by the recoil spring. The pressure of the cam 97 against the portion 74 of the lever 66 will cause the lever 66 to swing about its pivot 78, compressing the spring 79 and withdrawing the pin 68 from the hole 69 of the hammer 31.

Thus due to the described arrangement, the hammer 31 is separated from the slide 23 during the return movement of the slide and will remain in the cocked position until the slide 23 has practically completed its reciprocatory movement. Then the hammer 31 will be automatically released, so that the spring 44 and the strut 41 will cause it to strike with full force against the firing pin 56.

Cartridge shells are ejected by the recoil movement of the slide and new cartridges are introduced from the magazine into the barrel by the usual means not shown in the drawings. The hammer now continues to swing back and forth automatically so that the pistol operates as a machine gun firing shots in rapid succession until the magazine has been emptied, or until the shooter releases the trigger 28.

As soon as the trigger is released, the spring arm 61 will press the sear 39 against the hammer 31, so that the end 38 of the sear will drop into the notch 37 and will hold the hammer in its cocked position after the next recoil movement of the slide 23.

When the magazine has been emptied, the slide 23 is held open in the usual manner by a slide stop (not shown).

In accordance with the present invention, auxiliary means are provided for firmly holding the pistol during continuous firing:

A magazine 24 (Figure 8) has an outer end provided with a plate 85 which is formed with a dovetail-shaped groove fitting over a dovetail-shaped projection of a plate 86 (Fig. 10) which is attached to the underside of the barrel-supporting portion of the receiver 20 and is held therein by a spring detent 91 (Fig. 9). Thus, when the outer end of magazine 24 is inserted over the plate 86, the magazine 24 will be suspended from the receiver 20 and will serve as a grip for the pistol. This handle will be situated close to the muzzle end of the gun, so that it may be held firmly by a hand of the shooter during continuous firing. This adds greatly to the accuracy of the shooting.

It is apparent that the plate 85 of the magazine 24 in no way interferes with the normal operation of the magazine supplying the cartridges to the chamber of the pistol by means of the magazine spring 95 when the magazine is situated within the handle 21.

The pistol constructed in accordance with the present invention my be also provided with a butt stock 87 (Fig. 8) so that it can be rested against the shoulder of the shooter similar to a rifle during continuous firing.

The front end of the butt stock 87 is detachably connected to the rear edge of the lower part of the handle 21 by a U-shaped guide 88 on the butt stock 87 fitting into correspondingly shaped grooves 89, as shown more particularly in Figures 11 and 12.

A spring-loaded detent 90 actuated by a pivoted arm 92 is provided for detachably connecting the butt 87 with the handle 21.

Figures 13 and 14 show a wooden grip member 93 connected with a U-shaped metal plate 94 having edges fitting into grooves or slots formed in the pistol to suspend the grip member 93 from the receiver.

The rifle shown in Figures 15 to 20 of the drawings includes a butt stock 100 connected to the receiver 101 constituting a casing for the firing mechanism.

A magazine 102 (Fig. 15) is used to supply the cartridges automatically to the chamber of the rifle.

The receiver 101 is provided with the usual guard 103 for the trigger 104.

Figures 15, 19:
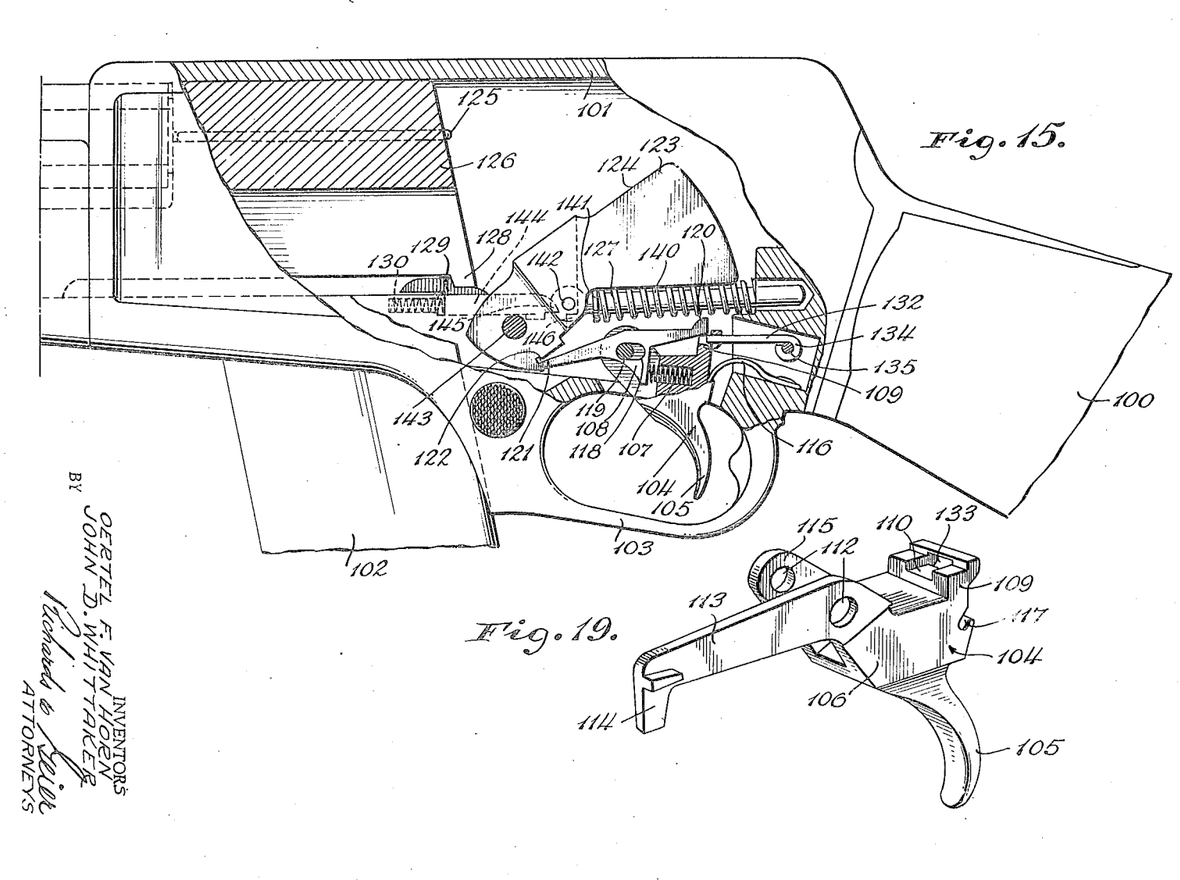
Figure 15 shows partly in side elevation and partly in longitudinal section a portion of an auto-loading convertible rifle constructed in accordance with the principles of present invention, the rifle being shown in the cocked position ready for intermittent firing.
Figure 19 is a perspective view of the rifle trigger.

As shown more clearly in Figures 15 and 19, the trigger 104 has a downwardly extending finger-engaging portion 105 and a body 106 serving as a casing for the spring 107 which engages the sear 108. The rear portion of the trigger body 104 has the form of an upwardly stepped platform 109 provided with a central recess 110 communicating with an opening 133.

The trigger 104 is mounted upon a pin 119 extending through openings 112 which are formed in a forwardly extending elongated arm 113 having the usual safety lock 114, and a short arm 115 extending parallel to the arm 113.

A spring 116 which is attached to an inner wall of the receiver 101, has an end fitting into a recess 117 of the trigger 104 and thus tends to maintain the trigger 104 in its forward position, which is shown in Figure 15.

The sear 108 which is mounted between the arms 115 and 113, is provided with an elongated slot 118 through which the pin 119 extends, and includes a rearwardly extending end portion 120 which may fit into the recess 110 of the trigger 104.

The forward end 121 of the sear 108 is adapted to engage a notch or a recess 122 of the hammer 123.

The hammer 123 is of the usual form and is provided with a surface 124 for striking the firing pin 125 which is carried by the slide 126 of the rifle. The hammer 123 is connected with a pin 140 actuated by a coiled spring 127.

One end of the spring 127 presses against an inner wall of the casing 101, while the other end of the spring is in engagement with a ring or flange 141 integral with the pin 142. The hammer 123 is rotatably mounted upon a pin 143.

The slide 126 is provided with a downwardly extending projection or edge portion 128 adapted to engage a hook-shaped element 129 constituting a part of a hammer slide or lock 144 which is actuated by a spring 130. The inner projecting end 145 of the slide 144 may engage a corresponding recess 146 of the hammer 123.

Figures 18, 20:
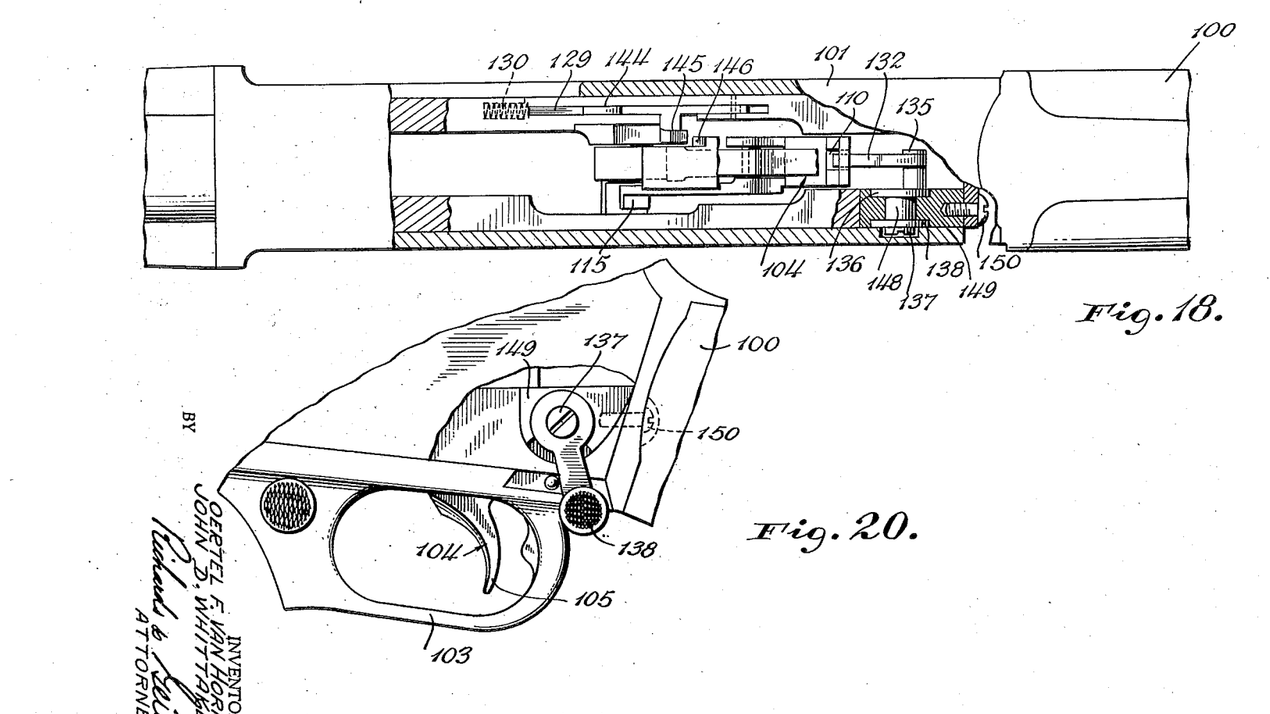
Figure 18 is a top view of the rifle with parts removed.
Figure 20 is a fragmentary side elevation partly in section showing the selector button of the rifle.

The selector or converter consists of an elongated slide element 132, the forward end of which fits into the opening 133 provided in the trigger 104. The rear end of the converter element 132 has the form of a ring 134 carried by a pin 135 which is eccentrically mounted in a plate 136 (Fig. 18). The plate is carried by a bearing block 148. A screw 137 connects a lever or button 138 with the bearing block 148. The block 148 is carried by a support 149 which is attached to the casing 101 by a bolt 150.

As shown in Figures 18 and 20, the button 138 may be moved along with the block 148, the plate 136, the pin 135 and the slide 132 from the "off" position to the "on" position and vice versa, and is adapted to be held firmly in each position.

Figure 15 shows the firing mechanism of the rifle while the lever or button 138 is situated in the "off" position shown in Figure 20, so that the trigger 104 must be pulled and released each time a shot is to be fired.

The hammer 123 is in its cocked position and the sear 108 is so located that its forward end 121 is situated within the recess 122 of the hammer. The rear end 120 of the sear 108 is situated within the recess 110 of the trigger 104.

When the trigger is pulled, it will swing about its pin 119 and will cause the sear 108 to turn slightly and to withdraw its end 121 from the recess 122, so that the hammer 123 will be released. Then the pin 140 which is actuated by the spring 127, will swing the hammer 123 about its pin 143 and will cause the surface 124 of the hammer to strike the firing pin 125 carried by the slide 126. The cartridge will be fired and the pressure of the powder gases while driving the bullet forward will force the slide 126 rearwardly. During the recoil movement, the slide 126 will swing the hammer 123 back into its cocked position.

In the meantime, the spring 107 will move the sear 108 forwardly and will raise somewhat the forward end 121 of the sear, so that it will be inserted again into the notch 122 of the hammer 123 during the return movement of the slide 126.

Therefore, when the slide 126 is returned to its normal position by the recoil spring, the hammer 123 will not follow the slide but will remain in the cocked position shown in Figure 15.

Figures 16, 17:
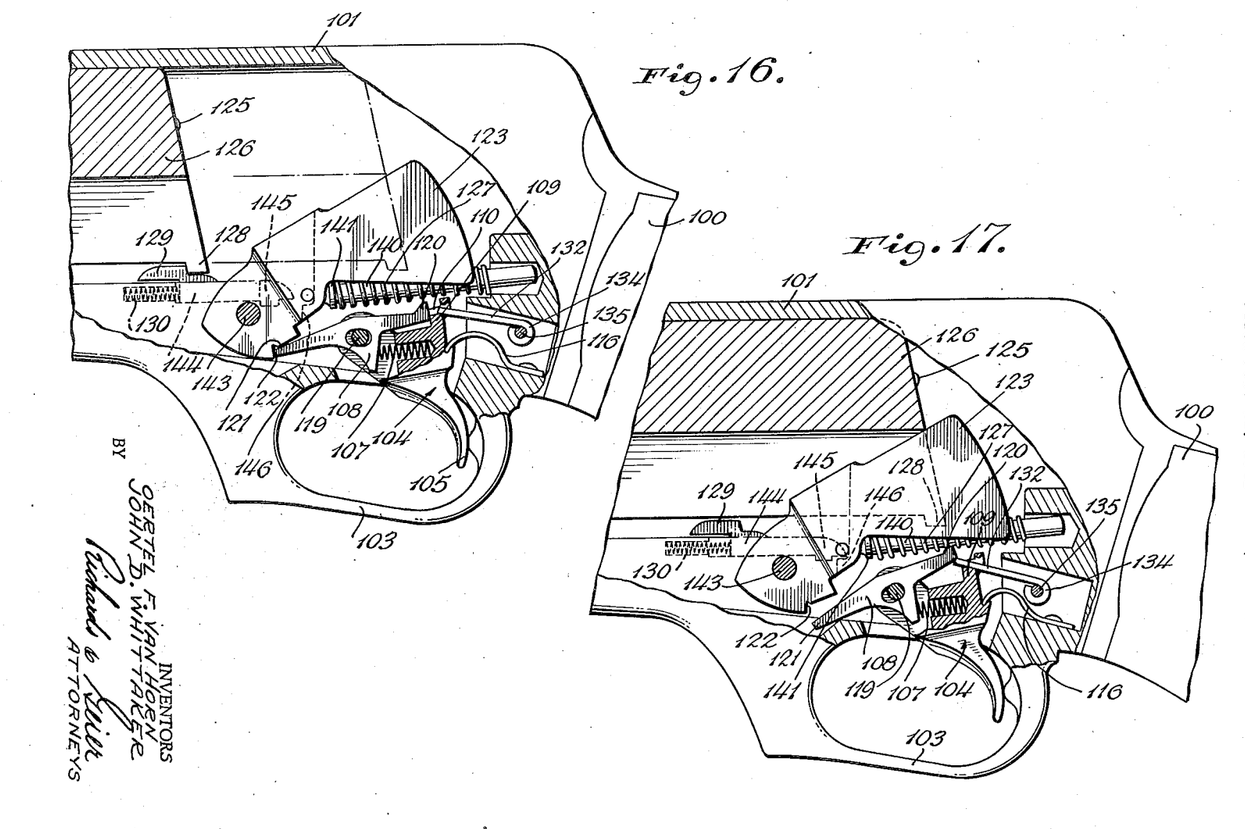
Figure 16 is similar to Figure 15 and shows the various parts in a position in which the trigger is depressed after firing.
Figure 17 is similar to Figure 16 and shows the rifle with the trigger depressed in the position for continuous firing.

As shown in Figure 16, the end 120 of the sear 108 will be situated substantially below the recess 110 and next to the projection 109 of the trigger 104, if pressure on the trigger is continued, so that the inclined position of the trigger will not cause the sear 108 to change its position and the end 121 of the sear 108 will continue to engage the notch 122 of the hammer 123. Therefore, the shooter may continue to exert pressure upon the trigger 104 without causing continuous firing.

In this position of the selector element 132, it is necessary for the shooter to release pressure upon the trigger 104, thus causing the trigger and the sear 108 to return to their positions shown in Figure 15 before another shot can be fired.

In order to convert the rifle into a continuously firing one, the lever 138 (Figure 18) must be moved to its "on" position in which the selector member 132 is shifted by the movement of the lever 138, the block 148, the plate 136, and the pin 135 to the position illustrated in Figure 17.

In this position, the forward end of the selector member 132 is raising the rear end 120 of the sear 108, so that the forward end 121 of the sear is held below the notch 122 of the hammer 123 when the trigger is held back. Therefore, after the rifle is fired and the hammer 123 is moved back by the recoil of the slide 126, the hammer will not be engaged by the forward end 121 of the sear 108.

However, the hammer 123 will be maintained for a while in its cocked position by the engagement of the rear end 145 of the sliding lock 144 with the recess 146 in the hammer 123.

The projection 128 of the slide 126 will engage the upwardly extending portion 129 of the lock 144 during the return movement of the slide 126 and will move the lock 144 with it, thereby withdrawing the end 145 of the lock from the recess 146 of the hammer, so that the hammer 123 is freed and will swing forward under the action of the spring 127, and the pin 140, striking the firing pin 125.

This cycle of operations will continue automatically until the supply of the cartridges in the magazine 102 is exhausted, or until the shooter releases his hold upon the trigger 104.

Figures 25, 26, 27:
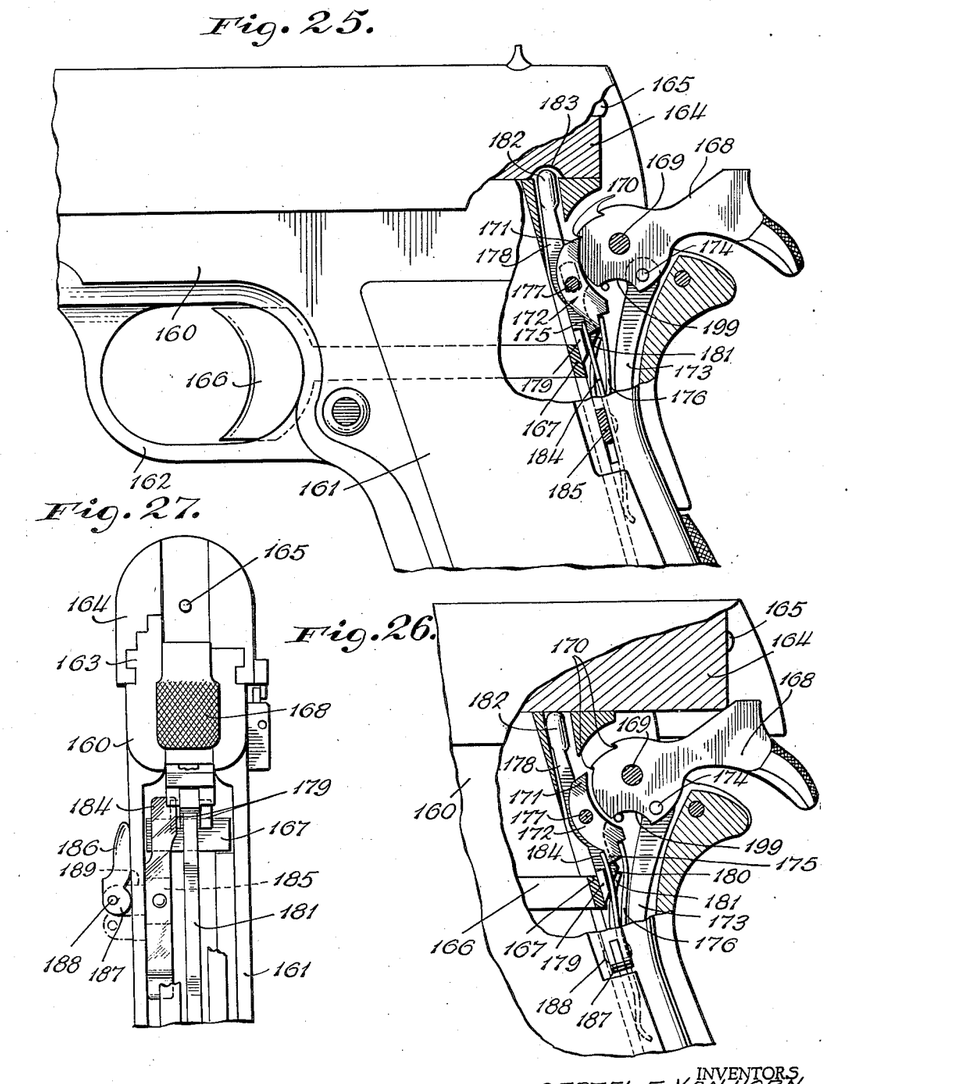
Figure 25 is a fragmentary side view, partly in section, of the same pistol in position for continuous firing.
Figure 26 is similar to Figure 25 and shows the slide in its recoil position and the trigger as being depressed.
Figure 27 is a rear view of the pistol, with some parts removed.

The pistol shown in Figures 21 to 27 has a somewhat different firing and hammer retaining mechanism. This pistol has a receiver 160 provided with a hollow handle 161, a trigger 166 (Fig. 25) and guides 163 upon which a slide 164 is reciprocably mounted (Fig. 27). The slide 164 carries the firing pin 165.

The trigger 166 includes a transverse rear portion 167 which actuates the firing mechanism when the trigger is pulled or depressed.

The firing mechanism includes the usual hammer 168 mounted upon a pin 169 (Fig. 25) and provided with a recess 199 and notches 170 which may be engaged by the reduced end 171 of a sear 172. The hammer strut 173 which is used to actuate the hammer, is mounted upon a pin 174 which is carried by the hammer 168.

The sear 172 is of the usual shape and has downwardly extending projections 175 which are engaged by a finger 176 of the sear spring. The sear 172 is carried by a pin 177 which also carries a disconnector 178 situated within the central slot of the sear.

In this construction, the disconnector 172 is of the usual form and is provided with two plates or projections 179 (Fig. 27) which are symmetrically disposed on both sides of a triangular end portion 180 having an inclined surface which is engaged by the finger 181 of the sear spring. The upper end 182 of the disconnector 178 fits into a groove 183 provided in the underside of the slide 164.

In this construction, the converter or selector is situated upon the left side of the pistol, and it includes a resilient converter finger 184 which is carried by a block 185. The block 185 is mounted within the hollow handle 161 of the pistol and is movable from an upper "on" position, or operative position, which is shown in the drawings, to an inoperative "off" position, or vice versa.

The slide 185 is held in each of the two positions by a lever 186 having a clamping portion 187 which is eccentrically mounted upon a pin 188 carried by a projection 189 which constitutes a part of the block 185.

Figures 21, 22, 23, 24, 28, 29, 30:
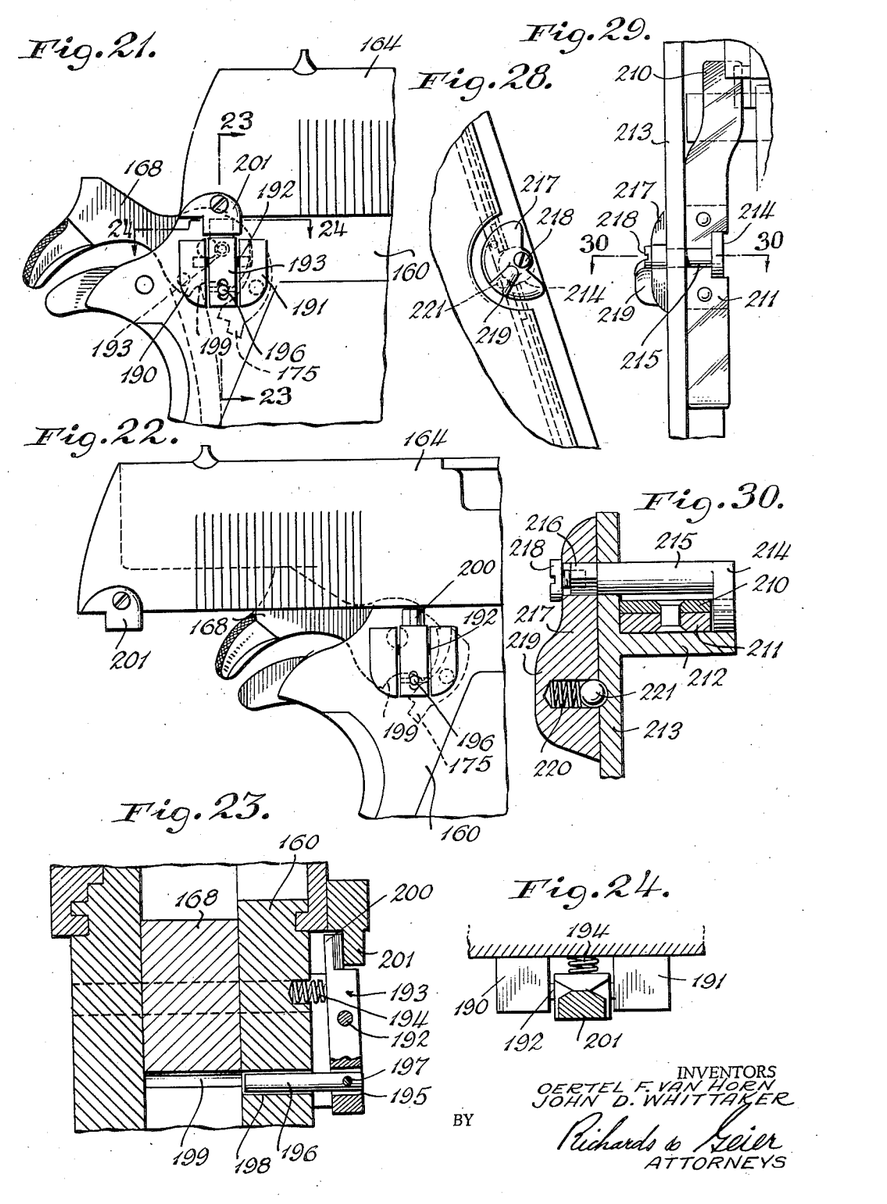
Figure 21 is a fragmentary side view of a pistol having a somewhat different converting mechanism.
Figure 22 is similar to Figure 21 and shows the slide in its recoil position.
Figure 23 is a section along the line 23—23 of Figure 21.
Figure 24 is a section along the line 24—24 of Figure 21.
Figure 28 is a fragmentary front elevation, illustrating a different converter-actuating mechanism.
Figure 29 is a side view, partly in section, showing the mechanism illustrated in Figure 28.
Figure 30 is a section along the line 30—30 of Fig. 29.

The mechanism used to prevent the hammer 168 from following the slide 164 during continuous firing, includes two projections 190 and 191 (Fig. 21) which may be integral with the receiver 160. The projections 190 and 191 carry the ends of a pivot 192. A lever 193 is carried by the pivot 192 and is engaged by a spring 194 mounted in a recess of the receiver 160 (Fig. 23). A slot 195 is provided close to the lower end of the lever 193. A pin 196 which is mounted upon a pivot 197, extends through the slot 195 and also through a slot 198 provided in the receiver 160. The pin 196 is so disposed that its inner end may fit within the recess 199 of the hammer 168.

The upper end 200 of the lever 193 is provided with a cam surface 201 which engages the inner surface of a downwardly extending cam or projection 201 attached to or integral with the slide 164.

When the cam 201 is out of engagement with the end 200 of the lever 193, the spring 194 engaging the lever 193, will press the pin 196 inwardly so that, when the recess 199 is situated opposite the pin 196, the latter will be inserted into that recess. However, when the cam 201 is brought into engagement with the end 200 of the lever 193, it will swing this end of the lever inwardly, thereby compressing the spring 194 and withdrawing the pin 196 from the recess 199 and from engagement with the hammer 168.

When the block 185 and the finger 184 are in their lower inoperative positions, the firing mechanism of this pistol functions in the same manner as that of the pistol illustrated in Figures 1 to 12 of the drawings.

Continuous firing is carried out as follows:

In order to set the mechanism for continuous firing, the shooter releases the lever 186 (Fig. 27) and moves the plate 185 upward to its "on" position, whereupon the plate 185 is locked by depressing the lever 186. Then the resilient finger 184 is situated in the position shown in Figures 25 to 27, namely, between a projection 175 of the sear 172 and a projection 179 of the disconnector 178.

In the normal position of the slide 164, shown in Figure 21, the pin 196 is held out of the recess 199 of the hammer 168 by the action of the cam 201.

Then the hammer 168 will be held in its cocked position solely by the engagement of the sear 172 with a notch 170 of the hammer.

As soon as the shooter pulls the trigger 166, the trigger end 167 will engage the disconnector 178, and since in the operative position a projection 179 of the disconnector is in engagement with the finger 184 which is also in engagement with one of the projections 175 of the sear 172, the movement of the trigger end 167 will cause the sear to be pulled out of the notch 170, so that the hammer strut 173 can swing the hammer 168 about its pin 169 and cause the hammer to strike the firing pin 165, thereby firing the first shot.

The slide 164 will move back due to the recoil action and will swing the hammer 168 back to its cocked position. At that time, the pressure of the cam 201 upon the lever 193 will be released and the pressure of the spring 194 (Fig. 23) will cause the pin 196 to press against a side surface of the swinging hammer 168 until the hammer is moved to its cocked position. Then the pin 196 will be inserted into the recess 199 and will hold the hammer 168 in its cocked position, while the slide 164 moves forward to its normal position under the action of the recoil spring (not shown).

In the meantime, the disconnector 178 has been moved downwardly upon its pin 177 by the pressure exerted by the walls of the groove 183 of the slide 164 at the beginning of the recoil movement.

If the shooter now continues to hold the trigger 166 in the depressed position, the pressure of the trigger end 167 will continue to be transmitted through a projection 179 of the disconnector 178 to the finger 184, and by the finger 184 to the sear 172, despite the fact that the disconnector 178 is now in its downward position, as shown in Figure 26. Therefore, the sear 172 will be prevented from engaging the hammer 168.

The hammer 168 will be held in its cocked position by the pin 196 until the return movement of the slide 164 is completed, whereupon the cam 201 carried by the slide 164 will engage the end 200 of the lever 193 and will pull the pin 196 out of the recess 199, thereby enabling the hammer strut 173 to swing the hammer about its pin 169 and to cause the firing of another shot.

This intermittent swinging of the hammer, resulting in continuous firing, will continue until the supply of cartridges is exhausted or until the shooter releases the trigger 166.

As soon as the trigger is released, the parts of the mechanism will return to the position shown in Figure 25 and the spring arm 176 will cause the sear 172 to engage a notch 170 of the hammer 168.

Figures 28 to 30 show a converter actuating mechanism of a somewhat different type. This mechanism includes a resilient finger or slide 210 which is firmly attached to a block 211. The block 211 is slidable upon an inner flange 212 of a fire-arm receiver 213 and has a recess containing a cam or disc 214 which is eccentrically mounted upon a pivot pin 215. A square end 216 of the pivot pin 215 projects outside of the receiver 213 and carries a plate 217 which is mounted upon the pivot end 216 and is held thereon by a screw 218. The plate 217 is provided with a projecting finger-engaging portion 219 and carries a detent which includes a spring 220 and a ball 221 fitting into two recesses formed upon the underlying surface of the receiver.

In order to convert the fire-arm into a continuously shooting one, or into an intermittently firing gun, the shooter merely presses a finger against the projecting portion 219 of the plate 217 and turns the plate into one of two positions. The rotation of the plate 217 will be transmitted by the pivot pin 215 to the cam 214, and the turning of the cam within the recess of the block 211 will cause the block 211 and the finger 210 connected therewith to move up or down, so that the finger 210 will be moved into an operative position or an inoperative position.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

Throughout the specification and claims, the term "intermittent firing" is used to describe so-called semi-automatic firing, wherein the trigger must be pulled and released once for each shot, while the term "continuous firing" is used to describe so-called full automatic firing, wherein a plurality of cartridges are fired while the shooter holds the trigger in the depressed position.

What is claimed is:

1. In a convertible fire-arm for intermittent and continuous firing, in combination, a sear having a locking portion, a movable hammer adapted to be locked by said portion of the sear, a reciprocable slide engaging and moving said hammer, a trigger portion movable from an inoperative position to a depressed position, means actuated by said trigger portion during its movement from said inoperative position to said depressed position to withdraw said portion of the sear from engagement with said hammer, a spring engaging said sear for returning said portion of the sear into engagement with said hammer during intermittent firing, a converter element movable from a continuous firing position to an intermittent firing position, and vice versa, and engaging said sear and said trigger portion in said continuous firing position to maintain said portion of the sear out of engagement with said hammer while said trigger is in the depressed position, and automatically operable means locking said hammer during a part of the reciprocatory movement of said slide and releasing said hammer to enable it to move relatively to said slide during continuous firing.

2. In a convertible pistol for intermittent and continuous firing, in combination, a receiver having a handle, a sear movably mounted in said receiver and having a locking portion, a hammer movably mounted in said receiver and adapted to be locked by said portion of the sear, a slide reciprocably mounted upon said receiver and engaging and moving said hammer, a trigger portion movable from an inoperative position to a depressed position, means actuated by said trigger portion during its movement from said inoperative position to said depressed position to withdraw said portion of the sear from engagement with said hammer, a spring engaging said sear for returning said portion of the sear into engagement with said hammer during intermittent firing, a converter block mounted in said handle and movable from a continuous firing position to an intermittent firing position, and vice versa, a resilient finger connected with said block and movable therewith, said finger engaging said sear and said trigger portion in said continuous firing position to maintain said portion of the sear out of engagement with said hammer while said trigger is in the depressed position, and automatically operable means locking said hammer during a part of the reciprocatory movement of said slide and releasing said hammer to enable it to move relatively to said slide during continuous firing.

3. In a convertible pistol for intermittent and continuous firing, in combination, a receiver, a pin carried by said receiver, a sear swingably mounted upon said pin and having a locking portion, a hammer swingably mounted in said receiver and adapted to be locked by said portion of the sear, a slide reciprocably mounted upon said receiver and engaging and moving said hammer, a disconnector swingably mounted upon said pin and movable from an operative upper position to an inoperative lower position and vice versa, said disconnector having a portion engaging said sear in the operative upper position of the disconnector and being moved from said upper position to said lower position by said slide, a movable trigger having a rear end portion adapted to engage said disconnector and cause it to withdraw said portion of the sear from engagement with said hammer in the upper position of the disconnector, resilient means engaging said sear and said disconnector and tending to move said sear into its locking position and said disconnector into its upper position, a resilient finger movable from a continuous firing position to an intermittent firing position and vice versa, said finger being adapted to be engaged by the rear end portion of said trigger and to engage said sear in said continuous firing position to maintain said portion of the sear out of engagement with said hammer, while said trigger is pulled, and automatically operable means locking said hammer during a part of the reciprocatory movement of said slide and releasing said hammer to enable it to swing relatively to said slide during continuous firing.

4. A convertible pistol in accordance with claim 3, wherein said disconnector comprises a lower end portion having a slanting surface engaged by said resilient means, and a single plate-like projection extending at one side of said lower end portion and constituting the sear-engaging portion of the disconnector.

5. A convertible pistol in accordance with claim 3, comprising a block connected with said resilient finger and movable therewith from said intermittent firing position to said continuous firing position, and vice versa, said block being mounted in said receiver and extending through a slot formed therein, a button situated outside of said receiver and pivotally connected with said block, and resilient means engaging said button for locking it in said firing positions.

6. In a convertible rifle for intermittent and continuous firing, in combination, a casing, a sear movably mounted in said casing and having a locking portion and a converter-engaging portion, a movable hammer adapted to be locked by said locking portion of the sear, a slide reciprocably mounted on said casing and engaging and moving said hammer, a trigger movably mounted in said casing and having a portion engaging said sear and withdrawing the locking portion thereof from engagement with said hammer when said trigger is actuated, a spring engaging said sear for returning said locking portion of the sear into engagement with said hammer during intermittent firing, a converter element movable from a continuous firing position to an intermittent firing position and vice versa and engaging said converter-engaging portion of the sear and said trigger portion in said continuous firing position to maintain said locking portion of the sear out of engagement with said hammer while said trigger is in the depressed position, and automatically operable means locking said hammer during a part of the reciprocatory movement of said slide and releasing said hammer to enable it to move relatively to said slide during continuous firing.

7. In a convertible rifle for intermittent and continuous firing, in combination, a casing, a pin mounted in said casing, a trigger mounted on said pin and having a projecting portion, a sear mounted in said casing and having a locking portion and a trigger-engaging portion, a hammer movably mounted in said casing and adapted to be locked by said locking portion of the sear, a slide reciprocably mounted on said casing and engaging and moving said hammer, the projecting portion of said trigger engaging the trigger-engaging portion of said sear and withdrawing the locking portion thereof from engagement with said hammer when said trigger is actuated, a spring engaging said sear and said trigger for returning said locking portion of the sear into engagement with said hammer during intermittent firing, an opening formed in the projecting portion of said trigger, a converter element movable through said opening from an intermittent firing position to a continuous firing position, and vice versa, and engaging said trigger-engaging portion of the sear and said trigger portion in said continuous firing position to maintain said locking portion of the sear out of engagement with said hammer while said trigger is in the depressed position, and automatically operable means locking said hammer during a part of the reciprocatory movement of said slide and releasing said hammer to enable it to move relatively to said slide during continuous firing.

8. A convertible rifle in accordance with claim 6, comprising a disc, a pivot carrying one end of said converter element and eccentrically mounted upon said disc, a lever situated outside of the rifle casing, means operatively connecting said lever with said disc, whereby a turning of said lever turns said disc and moves said pivot and said converter element, and means carried by the rifle casing and supporting said disc.

9. In a convertible pistol for intermittent and continuous firing, in combination, a receiver, a pin carried by said receiver, a sear swingably mounted upon said pin and having a locking portion, a hammer swingably mounted in said receiver and adapted to be locked by said portion of the sear, a slide reciprocably mounted upon said receiver and engaging and moving said hammer, a disconnector swingably mounted upon said pin and movable from an operative upper position to an inoperative lower position and vice versa, said disconnector being moved from said upper position to said lower position by said slide, a movable trigger having a rear end portion adapted to engage said disconnector, resilient means engaging said sear and said disconnector and tending to move said sear into its locking position and said disconnector into its upper position, a resilient finger movable from a continuous firing position to an intermittent firing position and vice versa, said finger extending between and engaging said rear end portion and said sear in said continuous firing position, and automatically operable means locking said hammer during a part of the reciprocatory movement of said slide and releasing said hammer to enable it to swing relatively to said slide during continuous firing.

10. A convertible pistol in accordance with claim 9, comprising a block connected with said resilient finger and movable therewith from said intermittent firing position to said continuous firing position and vice versa, a slot formed in said receiver, said block being mounted in said receiver and extending through said slot, and a lever situated outside of said receiver and pivotally mounted upon said block, said lever having an eccentric portion engaging said receiver for locking said block and said finger when said lever is depressed.

OERTEL F. VAN HORN.
JOHN D. WHITTAKER.